United States Patent [19]

Dehnert et al.

[11] Patent Number: 4,855,412
[45] Date of Patent: Aug. 8, 1989

[54] DIAMINOPYRIDINE AZO DYES HAVING ACYLOXY RADICALS SUBSTITUTED ON THE DIAMINOPYRIDINE

[75] Inventors: Johannes Dehnert, Ludwigshafen; Gunther Lamm, Hassloch; Hermann Loeffler, Speyer, all of Fed. Rep. of Germany

[73] Assignee: BASF Aktiengesellschaft, Ludwigshafen, Fed. Rep. of Germany

[21] Appl. No.: 42,243

[22] Filed: Apr. 24, 1987

[30] Foreign Application Priority Data

May 3, 1986 [DE] Fed. Rep. of Germany ....... 3615093

[51] Int. Cl.$^4$ .................. C09B 29/033; C09B 29/048; C09B 29/42; D06P 3/54
[52] U.S. Cl. .................................. 534/766; 534/765; 534/773; 534/573
[58] Field of Search ........................ 584/773, 765, 766

[56] References Cited

U.S. PATENT DOCUMENTS

| | | | |
|---|---|---|---|
| Re. 29,640 | 5/1978 | Lamm et al. | 534/773 X |
| 3,980,659 | 9/1976 | Fleckenstein et al. | 534/773 X |
| 4,042,578 | 8/1977 | Dehnert et al. | 534/773 X |

Primary Examiner—Floyd D. Higel
Attorney, Agent, or Firm—Oblon, Spivak, McClelland, Maier & Neustadt

[57] ABSTRACT

Compounds of the general formula

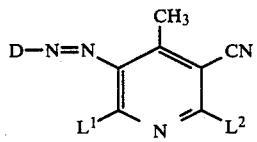

where
D is a radical of the formula

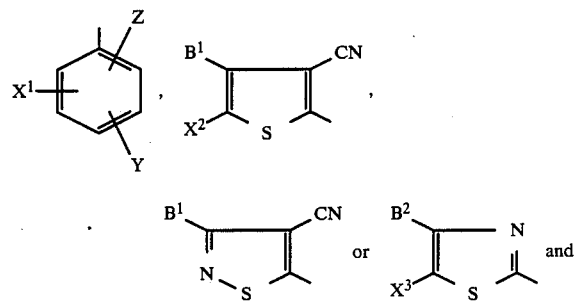

and one of the two radicals $L^1$ and $L^2$ is unsubstituted amino and the other the radical

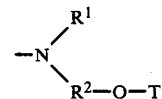

where
$R^1$ is hydrogen, $C_1$-$C_4$-alkyl, $C_1$-$C_4$-alkoxy-$C_2$-$C_4$-alkyl or $C_1$-$C_8$-acyloxy-$C_2$-$C_4$-alkyl,
$R^2$ is $C_2$-$C_{10}$-alkylene or $C_2$-$C_{10}$-alkylene is interrupted by oxygen,
T is $C_1$-$C_8$-alkanoyl which is unsubstituted or is substituted by chlorine or methoxy,
$B^1$ is $C_1$-$C_4$-alkyl or benzyl or phenyl, which are each unsubstituted or are each substituted by methyl, methoxy or chlorine,
$B^2$ is $B^1$, hydrogen, halogen, cyano or $C_1$-$C_5$-alkoxycarbonyl,
$X^1$ is hydrogen, nitro, cyano, $C_1$-$C_9$-alkoxycarbonyl, $C_1$-$C_9$-mono- or -dialkylaminocarbonyl, trifluoromethyl, methylsulfonyl or ethylsulfonyl,
$X^2$ is nitro or $C_1$-$C_5$-alkoxycarbonyl,
$X^3$ is $X^2$, cyano or formyl,
Y is hydrogen, chlorine, bromine, methyl, methoxy or ethoxy and
Z is hydrogen, chlorine, bromine, cyano or $C_1$-$C_9$-alkoxycarbonyl which is unsubstituted or is substituted by $C_1$-$C_4$-alkoxy, and one or more of the substituents $X^1$, Y and Z is different from hydrogen, are disclosed.

The dyes of the present invention may be used in dyeing synthetic polyester.

2 Claims, No Drawings

DIAMINOPYRIDINE AZO DYES HAVING ACYLOXY RADICALS SUBSTITUTED ON THE DIAMINOPYRIDINE

The present invention relates to compounds of the formula I (structure I: pyridine ring with $CH_3$, CN, $L^1$, $L^2$ substituents and $D-N=N-$ group)

where
D is a radical of the formula (three alternative structures shown with substituents $X^1$, Y, Z, $B^1$, $B^2$, $X^2$, $X^3$, CN, S, N)

one of the two radicals $L^1$ and $L^2$ is unsubstituted amino and the other the radical $$-N\diagup^{R^1}_{\diagdown R^2-O-T}$$

where
$R^1$ is hydrogen, $C_1$–$C_4$-alkyl, $C_1$–$C_4$-alkoxy-$C_2$–$C_4$-alkyl or $C_1$–$C_8$-acyloxy-$C_2$–$C_4$-alkyl, $R^2$ is $C_2$–$C_{10}$-alkylene which may be interrupted by oxygen, T is hydrogen or $C_1$–$C_8$-alkanoyl which may be substituted by chlorine or methoxy, $B^1$ is $C_1$–$C_4$-alkyl or benzyl or phenyl, which may each be substituted by methyl, methoxy or chlorine, $B^2$ is $B^1$, hydrogen, halogen, cyano or $C_1$–$C_5$-alkoxycarbonyl, $X^1$ is hydrogen, nitro, cyano, $C_1$–$C_9$-alkoxycarbonyl, $C_1$–$C_9$-mono- or -dialkylaminocarbonyl, trifluoromethyl, methylsulfonyl or ethylsulfonyl, $X^2$ is nitro or $C_1$–$C_5$-alkoxycarbonyl, $X^3$ is $X^2$, cyano or formyl, Y is hydrogen, chlorine, bromine, methyl, methoxy or ethoxy and Z is hydrogen, chlorine, bromine, cyano or $C_1$–$C_9$-alkoxycarbonyl which may be substituted by $C_1$–$C_4$-alkoxy, and one or more of the substituents $X^1$, Y and Z is different from hydrogen.

$R^1$, $B^1$ and $B^2$ in the formula I are for example methyl, ethyl, propyl, isopropyl, butyl, isobutyl or sec-butyl.

$R^1$ can further be 2-methoxyethyl, 2-ethoxyethyl, 2-methoxypropyl, 3-methoxypropyl, 4-methoxybutyl, 2-formyloxyethyl, 2-acetyloxyethyl, 2-propionyloxyethyl, 2-isobutyryloxyethyl, 2-hexanoyloxyethyl, 2-octanoyloxyethyl, 2-(2'-ethylhexanoyloxy)ethyl, 2- or 3-formyloxypropyl, 2- or 3-acetyloxypropyl, 2- or 3-propionyloxypropyl, 2- or 3-isobutyryloxypropyl, 2- or 3-hexanoyloxypropyl, 2- or 3-octanoyloxypropyl, 2- or 3-(2'-ethylhexanoyloxy)propyl, 4-acetyloxybutyl or 4-(2'-ethylhexanoyloxy)butyl.

$B^1$ and $B^2$ can further be benzyl, 2-methylbenzyl, 4-methylbenzyl, 2-methoxybenzyl, 4-methoxybenzyl, 2,4-dimethoxybenzyl, 2-chlorobenzyl, 4-chlorobenzyl, phenyl, 2-methylphenyl, 4-methylphenyl, 2,4-dimethylphenyl, 2-methoxyphenyl, 4-methoxyphenyl, 2-chlorophenyl, 4-chlorophenyl or 2,6-dichlorophenyl.

Alkylene radicals $R^2$ are for example:

$(CH_2)_2$, $(CH_2)_3$, $CH_2-CH(CH_3)$, $CH(CH_3)-CH_2$, $C_4H_8$, $CH(CH_3)-(CH_2)_2$, $CH(C_2H_5)-CH_2$, $(CH_2)_6$, $CH(CH_3)-(CH_2)_3C(CH_3)_2$, $(CH_2)_2O(CH_2)_2$, $(CH_2)_3O(CH_2)_2$, $(CH_2)_3O(CH_2)_3$, $(CH_2)_3O(CH_2)_4$ or $(CH_2)_2O(CH_2)_2O(CH_2)_2$.

T in the formula I is for example formyl, acetyl, propionyl, isobutyryl, pentanoyl, 2,2-dimethylpropanoyl, hexanoyl, heptanoyl, octanoyl, 2-ethylhexanoyl, chloroacetyl or methoxyacetyl.

$B^2$ in the formula I is for example chlorine or bromine.

$B^2$, like $X^1$, $X^2$, $X^3$ and Z, can also be for example methoxycarbonyl, ethoxycarbonyl, propoxycarbonyl, isopropoxycarbonyl, butoxycarbonyl, isobutoxycarbonyl, sec-butoxycarbonyl or pentyloxycarbonyl.

$X^1$ and Z can also be for example hexyloxycarbonyl, heptyloxycarbonyl, octyloxycarbonyl, 2-ethylhexyloxycarbonyl or nonyloxycarbonyl.

$X^1$ can also be for example methylaminocarbonyl, ethylaminocarbonyl, propylaminocarbonyl, isopropylaminocarbonyl, butylaminocarbonyl, isobutylaminocarbonyl, sec-butylaminocarbonyl, pentylaminocarbonyl, hexylaminocarbonyl, heptylaminocarbonyl, octylaminocarbonyl, 2-ethylhexylaminocarbonyl, nonylaminocarbonyl, dimethylaminocarbonyl, or diethylaminocarbonyl.

Z can also be for example 2-methoxyethoxycarbonyl, 2-ethoxyethoxycarbonyl or 3-methoxypropoxycarbonyl.

To prepare a compound according to the invention of the formula I, a coupling component of the formula II (structure II: pyridine ring with $CH_3$, CN, $L^3$, $L^4$ substituents)

where one of the radicals $L^3$ and $L^4$ is unsubstituted amino and the other the radical $$-N\diagup^{R^1}_{\diagdown R^2-OH}$$

where $R^1$ and $R^2$ have the abovementioned meanings, can be treated in an excess of an organic monocarboxylic acid of the formula $T^2$—OH, where $T^2$ is $C_1$-$C_8$-alkanoyl which may be substituted by chlorine or methoxy, in the presence of a mineral acid or of an organic sulfonic acid at from 0° to 120° C., preferably from 20° to 60° C., with or without elimination of the water of reaction, and the acylation product is subsequently coupled in a conventional manner with a diazonium salt derived from an amine of the formula D—$NH_2$, where D has the abovementioned meanings, to give a dye of the formula I.

The acylation in the above sequence can advantageously be combined with the preparation of the hydroxyalkylaminopyridine, thereby saving the intermediate isolate thereof and minimizing the use of acylating agent.

Similarly, it is alo possible to acylate an azo dye of the formula III

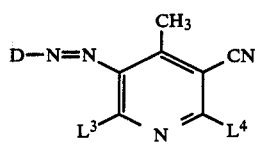

(III)

where D, $L^3$ and $L^4$ each have the abovementioned meanings, to give a novel dye of the formula I.

The degree of acylation can be controlled via the amount of mineral or sulfonic acid and the water content of the reaction mixture and, in the absence of water, is 100%.

Complete acylation is usually not necessary for the resulting dye to have optimal dyeing properties. Frequently, it is precisely the choice of degree of acylation which makes it possible to optimize diverging dyeing and fastness properties such as exhaustion, temperature dependence, buildup and fastness to dry heat setting.

The methods described in DE-A Nos. 2,156,545 and 2,251,702 for acylating aminopyridines using acid anhydrides or halides, if applied to a compound of the formula II, also block the unsubstituted amino group. The corresponding acylamino compounds, however, are no longer couplable, so that acylated dyes of the formula I are obtainable in this way only in considerably reduced yields, if at all.

The novel dyes of the formula I are highly suitable for dyeing synthetic polyesters, giving excellent dyeings of very good light fastness, wash fastness and heat setting fastness.

Of particular importance are dyes of the formula I where D is a radical of the formula

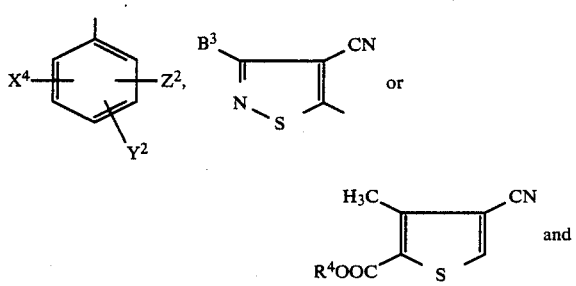

one of the two radicals $L^1$ and $L^2$ is an unsubstituted amino group and the other is —NH—$R^3$—O—$T^1$, where $R^3$ is $(CH_2)_2O(CH_2)_2$, $(CH_2)_3O(CH_2)_3$ or $(CH_2)_3O(CH_2)_4$, $T^1$ is hydrogen or $C_1$-$C_4$-alkanoyl, $X^4$ is nitro, cyano, methylsulfonyl or ethylsulfonyl, $Y^2$ is hydrogen, chlorine or bromine, $Z^2$ is hydrogen, cyano or $C_1$-$C_5$-alkoxycarbonyl, $B^3$ is $C_1$-$C_3$-alkyl, benzyl or phenyl and $R^4$ is methyl or ethyl.

Very particular preference is given to mixtures of the novel compounds of the formula I where on the one hand one of the two radicals $L^1$ and $L^2$ is an unsubstituted amino group and the other is —NH—$R^3$—OH and on the other hand one of the two radicals $L^1$ and $L^2$ is unsubstituted amino and the other is NH—$R^3$—O—$T^3$, where $R^3$ has in each case the abovementioned meanings and $T^3$ is $C_1$-$C_4$-alkanoyl.

These mixtures contain for example individual components which conform to the formula IV

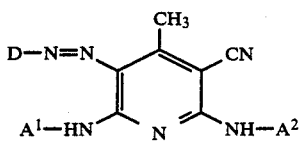

(IV)

where D has the abovementioned meanings. In the individual components IVa to IVd, the radicals $A^1$ and $A^2$ have the following meanings:

| | | | | |
|---|---|---|---|---|
| IVa: | $A^1$ = hydrogen | IVb: | $A^1$ = $R^3$—OH | |
| | $A^2$ = $R^3$—OH | | $A^2$ = hydrogen | |
| IVc: | $A^1$ = hydrogen | IVd: | $A^1$ = $R^3$—$OT^3$ | |
| | $A^2$ = $R^3$—$OT^3$ | | $A^2$ = hydrogen. | |

These mixtures are formed for example on reacting 2,6-dichloro-3-cyano-4-methylpyridine first with ammonia and then with an appropriate alkanolamine, thereafter acylating and subsequently coupling. As stated above, the degree of acylation, ie. the molar ratio IVa:IVc and IVb:IVd, depends on the reaction conditions.

The isomer ratios IVa:IVb and IVc:IVd are in addition dependent on the coupling activity of the diazo component and the amount of coupling component used in relation thereto and can vary within wide limits. Preference is given to an isomer ratio of IVa:IVb and IVc:IVd of from 3:2 to 3:1.

Further details of the preparation can be found in the Examples, where parts and percentages are by weight, unless otherwise stated.

The $\lambda_{max}$ values were always measured in acetone.

EXAMPLE 1

13.8 parts of 4-nitroaniline were dissolved in 200 parts by volume of hot water using 30 parts by volume of 30% strength hydrochloric acid. The still warm solution was poured onto 300 parts of ice, and 30 parts by volume of 3.33N sodium nitrite solution were rapidly added. The mixture was stirred for about 15 minutes in the presence of an excess of nitrous acid, and this excess was then destroyed with a little sulfamic acid. The resulting diazonium salt solution was then added to the solution of the coupling component, which was prepared as follows:

A mixture of 17 parts of 2-chloro-3-cyano-4-methyl-6-aminopyridine, 20 parts by volume of isobutanol, 18 parts of 3-aminopropyl 4-hydroxybutyl ether and 8 parts of sodium carbonate was heated for 5 hours with thorough stirring at 145°/150° C. using a descending condenser until a thin layer chromatogram indicated complete conversion. After cooling down to about 100° C., 35 parts of acetic acid were then added dropwise, followed at 35°/40° C. with continued gentle cooling by 15 parts of 96% strength sulfuric acid. After 3 hours of stirring under a pressure of 45 mm Hg, 96% of the hydroxy compound had been acetylated.

To obtain coupling, the reaction mixture was diluted with 300 parts of ice and 100 parts by volume of water. By gradual addition of 100 parts by volume of saturated sodium acetate solution (reaction mixture pH: about 2) and stirring for about an hour at about +5° C., the diazonium salt was made to react. Thereafter the reaction mixture was filtered off with suction, and the filter cake was washed until neutral and dried at 80° C.

The resulting brownish red powder corresponds to about 92% to the isomer mixture of the formula

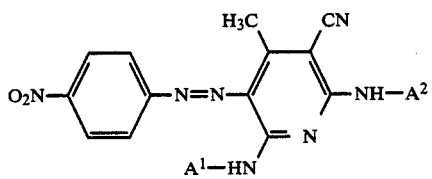

$\lambda_{max} = 465$ nm
(1) $A^1 = H$
$A^2 = C_3H_6-O-C_4H_8-O-COCH_3$
(2) $A^1 = C_3H_6-O-C_4H_8-O-COCH_3$
$A^2 = H$ and still contains about 8% of unacetylated hydroxy compounds.

On application to PES fabric by the high-temperature method, this powder produced a very strong dyeing with complete exhaustion of the dyebath at as low a temperature as 125°/130° C. The dyeing exhibited excellent allround fastness.

EXAMPLE 2

17.3 parts of 2-chloro-4-nitroaniline were stirred together with 40 parts by volume of 30% strength hydrochloric acid for one hour in 120 parts of water. Water and ice were added to bring the volume to 500 parts and the temperature to 10° C., and 30 parts by volume of 3.33N sodium nitrite solution were then introduced underneath the surface. After two hours' stirring at 10° C. with excess acid present, 250 parts of ice were added to the diazonium salt solution. Then the solution of the coupling component, prepared as described in Example 1 but acylated with 40 parts of propionic acid instead of acetic acid, was added. (The water content of the acetylation mixture was 10%.)

After two hours of stirring at from 5° to 10° C., the diazonium salt had been consumed. This was followed by cold filtration with suction, washing of the filter cake until neutral and drying at 80° C.

The resulting reddish brown powder corresponds to about 75% to the isomer mixture

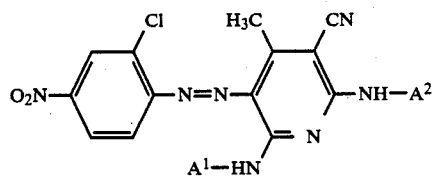

$\lambda_{max} = 483$ nm
(1) $A^1 = H$
$A^2 = C_3H_6-O-C_4H_8-O-COC_2H_5$
(2) $A^1 = C_3H_6-O-C_4H_8-O-COC_2H_5$
$A^2 = H$ and still contains about 25% of unacylated hydroxy isomer.

Applied to PES by the high-temperature method at 125°/130° C., the dye gave very strong reddish orange dyeings of very good allround fastness.

EXAMPLE 3

16.3 parts of 2-cyano-4-nitroanilline were suspended at 10°/15° C. in 150 parts by volume of glacial acetic acid and 50 parts by volume of propionic acid by stirring. 31.5 parts of 40% strength nitrosylsulfuric acid were added dropwise, which was followed by two hours of stirring at 10°/15° C. until solution was complete. Said solution was added to a coupling component solution prepared from 250 parts of ice and, after acylation with 40 parts of isobutyric acid, the component of Example 1. The acylation mixture contained 2% of water.

The coupling reaction was complete within a short time. The dye was filtered off with suction, washed until neutral and dryed at 80° C.

The red powder obtained contained about 85% of a mixture of the acyl isomers

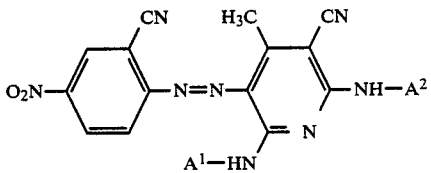

$\lambda_{max} = 500$ nm
(1) $A^1 = H$
$A^2 = C_3H_6-O-C_4H_8-O-COCH(CH_3)_2$
(2) $A^1 = C_3H_6-O-C_4H_8-O-COCH(CH_3)_2$
$A^2 = H$ and dyed PES in yellowish red shades of very high fastness.

The procedures of Examples 1, 2 and 3 can be used, if desired with slight variation in concentration, temperature and solvent, to obtain the dyes described in the Tables below, which give similar results in terms of color and fastness.

The dyes which are characterized hereinafter in terms of substituents are indicated in each case only in the form of the main isomer. However, these dyes always exist in the form of the isomer mixtures formed with complete or incomplete acylation in the method of preparation described.

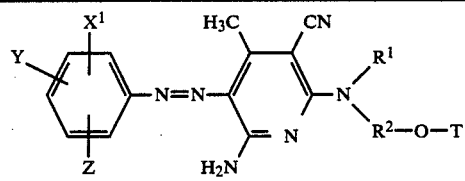

| Example No. | $X^1$ | Y | Z | $R^1$ | $R^2-O-T$ | λ max nm |
|---|---|---|---|---|---|---|
| 4 | 4-$NO_2$ | H | H | H | $C_3H_6-O-C_4H_8-O-COC_2H_5$ | 465 |
| 5 | 4-$NO_2$ | 2-Cl | H | H | $C_3H_6-O-C_4H_8-O-COCH_3$ | 483 |
| 6 | 4-$NO_2$ | H | 2-CN | H | $C_3H_6-O-C_4H_8-O-COC_2H_5$ | 500 |
| 7 | 4-$NO_2$ | 2-Cl | 6-CN | H | $C_3H_6-O-C_4H_8-O-COCH_3$ | 507 |
| 8 | 4-$NO_2$ | 2-Cl | 6-CN | H | $C_3H_6-O-C_4H_8-O-COH$ | 507 |
| 9 | 4-$NO_2$ | 2-Cl | 6-CN | H | $C_2H_4-O-C_2H_4-O-COCH_3$ | 506 |
| 10 | 4-$SO_2CH_3$ | 2-Cl | H | H | $C_3H_6-O-C_4H_8-O-COCH_3$ | 453 |
| 11 | 4-$NO_2$ | H | 2-$COOC_2H_4OCH_3$ | H | $C_3H_6-O-COC_2H_5$ | 480 |
| 12 | 4-CN | 2-Cl | H | H | $C_3H_6-O-C_4H_8-O-COCH_3$ | 457 |
| 13 | 4-Cl | H | 2-CN | H | $C_3H_6-O-C_4H_8-O-COCH_3$ | 453 |
| 14 | 4-$NO_2$ | H | H | $C_4H_9$ | $C_2H_4-O-COCH_3$ | 473.5 |
| 15 | 4-$NO_2$ | H | H | $C_2H_4OCH_3$ | $C_2H_4-O-COC_2H_5$ | 473 |
| 16 | 4-$NO_2$ | 2-Cl | H | $C_2H_4OCOC_2H_5$ | $C_2H_4-O-COC_2H_5$ | 491 |
| 17 | 4-$NO_2$ | H | 6-CN | $C_2H_5$ | $C_2H_4-O-COCH(CH_3)_2$ | 508 |
| 18 | 4-$NO_2$ | H | H | H | $C_2H_4-O-COCH(C_2H_5)-C_4H_9$ | 463 |
| 19 | 4-$NO_2$ | 2-Cl | H | H | $C_3H_6-O-COCH(C_2H_5)-C_4H_9$ | 484 |
| 20 | 4-$NO_2$ | 2-Cl | H | H | $C_6H_{12}-O-COCH_3$ | 484 |
| 21 | 2-CN | H | H | H | $C_3H_6-O-C_4H_8-O-COCH_3$ | 440 |
| 22 | 4-$NO_2$ | 2-$SO_2C_2H_5$ | H | H | $C_3H_6-O-C_4H_8-O-COCH_3$ | 501 |
| 23 | 4-$NO_2$ | 2-Cl | H | H | $CH_2-CH(CH_3)-O-COCH(CH_3)_2$ | 482 |
| 24 | 4-$NO_2$ | H | 6-CN | H | $C_3H_6-O-COCH_2OCH_3$ | 501 |
| 25 | 4-$NO_2$ | H | 6-CN | $C_4H_9$ | $C_2H_4-O-COC_2H_5$ | 508.5 |
| 26 | 4-$NO_2$ | 2-Cl | 6-CN | $C_2H_4OCH_3$ | $C_2H_4-O-COC_2H_5$ | 514 |
| 27 | 4-$NO_2$ | H | H | H | $CH(CH_3)-C_2H_4-O-COC_2H_5$ | 464 |
| 28 | 4-$NO_2$ | H | H | H | $CH(C_2H_5)-CH_2-O-COC_2H_5$ | 463 |
| 29 | 4-$NO_2$ | 2-Cl | H | H | $CH(C_2H_5)-CH_2-O-COC_2H_5$ | 482 |

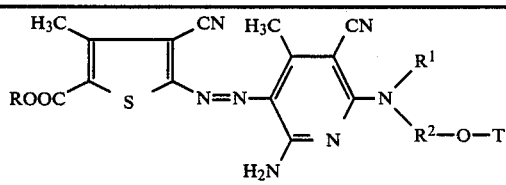

| Example No. | R | $R^1$ | $R^2-O-T$ | λ max nm |
|---|---|---|---|---|
| 30 | $CH_3$ | H | $C_3H_6-O-C_4H_8-O-COCH_3$ | 516.5 |
| 31 | $CH_3$ | H | $C_3H_6-O-C_4H_8-O-COC_2H_5$ | 516.5 |
| 32 | $CH_3$ | H | $C_3H_6-O-C_4H_8-O-COCH(CH_3)_2$ | 516.5 |
| 33 | $CH_3$ | H | $C_3H_6-O-CO-CH(C_2H_5)(C_4H_9)$ | 518 |
| 34 | $C_2H_5$ | H | $C_3H_6-O-C_4H_8-O-COC_2H_5$ | 516.5 |
| 35 | $C_4H_9$ | H | $C_3H_6-O-C_4H_8-O-COCH_3$ | 517 |

-continued

| | | | | |
|---|---|---|---|---|
| 36 | CH$_3$ | C$_4$H$_9$ | C$_2$H$_4$—O—COCH$_3$ | 525 |
| 37 | CH$_3$ | C$_2$H$_4$OCH$_3$ | C$_2$H$_4$—O—COC$_2$H$_5$ | 524 |
| 38 | C$_4$H$_9$ | C$_4$H$_9$ | C$_2$H$_4$—O—CHO | 525 |
| 39 | CH$_3$ | H | CH(CH$_3$)—C$_2$H$_4$—O—COCH$_3$ | 516 |
| 40 | CH$_3$ | H | CH(C$_2$H$_5$)—CH$_2$—O—COCH$_3$ | 515 |

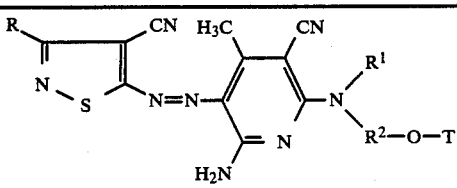

| Example No. | R | R$^1$ | R$^2$—O—T | λ max nm[1] |
|---|---|---|---|---|
| 41 | CH$_3$ | H | C$_3$H$_6$—O—C$_4$H$_8$—O—COCH(CH$_3$)$_2$ | 506 |
| 42 | CH$_3$ | H | C$_3$H$_6$—O—COCH(C$_2$H$_5$)(C$_4$H$_9$) | 507 |
| 43 | CH(CH$_3$)$_2$ | H | C$_3$H$_6$—O—C$_4$H$_8$—O—COCH$_3$ | 506 |
| 44 | CH$_2$—C$_6$H$_5$ | H | C$_3$H$_6$—O—C$_4$H$_8$—O—COCH$_3$ | 509 |
| 45 | CH$_2$—C$_6$H$_5$ | H | C$_3$H$_6$—O—COC$_2$H$_5$ | 510 |
| 46 | CH$_3$ | C$_4$H$_9$ | C$_2$H$_4$—O—COCH$_3$ | 522 |
| 47 | CH$_2$—C$_6$H$_5$ | C$_4$H$_9$ | C$_2$H$_4$—O—COCH$_3$ | 525 |
| 48 | CH$_2$—C$_6$H$_5$ | C$_4$H$_9$ | CH(CH$_3$)—C$_2$H$_4$—O—COCH$_3$ | 510 |

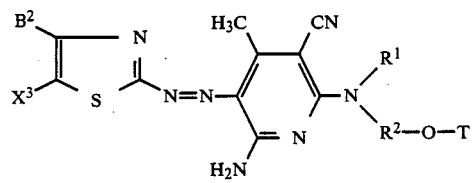

| Example No. | B$^2$ | X$^3$ | R$^1$ | R$^2$—O—T | λ max nm |
|---|---|---|---|---|---|
| 49 | C$_6$H$_5$ | CN | H | C$_3$H$_6$—O—C$_4$H$_8$—O—COCH$_3$ | 500 |
| 50 | C$_6$H$_5$ | CN | H | CH(CH$_3$)C$_2$H$_4$—O—COCH$_3$ | 501 |

-continued

| No. | | | | | |
|---|---|---|---|---|---|
| 51 | 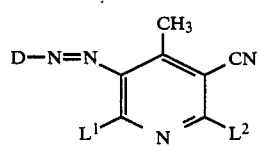 | CN | H | $C_3H_6-O-COC_2H_5$ | 501 |
| 52 | $COOC_2H_5$ | $COOC_2H_5$ | H | $C_3H_6-O-C_4H_8-O-COC_2H_5$ | 493 |
| 53 | $COOC_2H_5$ | $COOC_2H_5$ | H | $C_3H_6-O-COCH\begin{smallmatrix}C_2H_5\\C_4H_9\end{smallmatrix}$ | 494 |
| 54 | 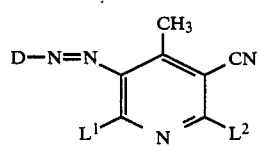 | CN | $C_2H_5$ | $C_2H_4-O-COCH_3$ | 508 |
| 55 | $COOC_2H_5$ | $COOC_2H_5$ | $C_4H_9$ | $C_2H_4-O-COCH_3$ | 501.5 |
| 56 | $COOC_2H_5$ | CN | $C_4H_9$ | $C_2H_4-O-COCH_3$ | 508.5 |
| 57 | $COOC_2H_5$ | CN | H | $C_3H_6-O-COCH\begin{smallmatrix}C_2H_5\\C_4H_9\end{smallmatrix}$ | 500 |
| 58 | H | $NO_2$ | H | $C_3H_6-O-COCH\begin{smallmatrix}C_2H_5\\C_4H_9\end{smallmatrix}$ | 518 |
| 59 | Cl | CHO | H | $C_3H_6-O-COCH\begin{smallmatrix}C_2H_5\\C_4H_9\end{smallmatrix}$ | 517 |
| 60 | $CH_3$ | $COOC_2H_5$ | H | $C_3H_6-O-COCH\begin{smallmatrix}C_2H_5\\C_4H_9\end{smallmatrix}$ | 493 |
| 61 | $CH_3$ | $COOCH_3$ | H | $C_3H_6-O-COCH\begin{smallmatrix}C_2H_5\\C_4H_9\end{smallmatrix}$ | 497 |
| 62 | CN | $COOCH_3$ | H | $C_3H_6-O-COCH\begin{smallmatrix}C_2H_5\\C_4H_9\end{smallmatrix}$ | 508 |

[1]in 9:1 DMF/acetic acid

We claim:

1. A compound of the formula:

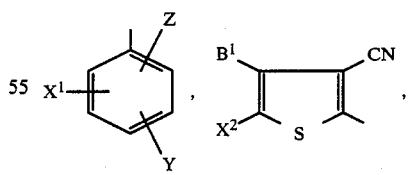

where
D is a radical of the formula

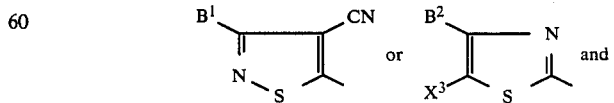

one of the two radicals $L^1$ and $L^2$ is unsubstituted amino and the other radical is

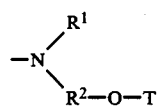

where
- $R^1$ is hydrogen, $C_1-C_4$-alkyl, $C_1-C_4$-alkoxy-$C_2-C_4$-alkyl or $C_1-C_8$-alkanoyloxy-$C_2-C_4$-alkyl,
- $R^2$ is $C_2-C_{10}$-alkylene or $C_2-C_{10}$-alkylene which is interrupted by oxygen,
- T is $C_1-C_8$-alkanoyl which is unsubstituted or is substituted by chlorine or methoxy,
- $B^1$ is $C_1-C_4$-alkyl or benzyl or phenyl, which are each unsubstituted or are each substituted by methyl, methoxy or chlorine,
- $B^2$ is $B^1$, hydrogen, halogen, cyano or $C_1-C_5$-alkoxycarbonyl,
- $X^1$ is hydrogen, nitro, cyano, $C_1-C_9$-alkoxycarbonyl, $C_1-C_9$-mono- or -dialkylaminocarbonyl, trifluoromethyl, methylsulfonyl or ethylsulfonyl,
- $X^2$ is nitro or $C_1-C_5$-alkoxycarbonyl,
- $X^3$ is $X^2$, cyano or formyl,
- Y is hydrogen, chlorine, bromine, methyl, methoxy or ethoxy and
- Z is hydrogen, chlorine, bromine, cyano or $C_1-C_9$-alkoxycarbonyl which is unsubstituted or is substituted by $C_1-C_4$-alkoxy, and one or more of the substituents $X^1$, Y and Z is different from hydrogen.

2. A compound as claimed in claim 1, wherein D is a radical of the formula

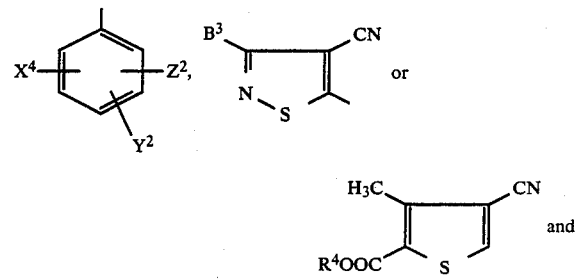

one of the two radicals $L^1$ and $L^2$ is unsubstituted amino and the other is $-NH-R^3-O-T^1$, where
- $R^3$ is $(CH_2)-O-(CH_2)_2$, $(CH_2)_3O(CH_2)_3$ or $(CH_2)_3O(CH_2)_4$,
- $T^1$ is $C_1-C_4$-alkanoyl,
- $X^4$ is nitro, cyano, methylsulfonyl or ethylsulfonyl,
- $Y^2$ is hydrogen, chlorine or bromine,
- $Z^2$ is hydrogen, cyano or $C_1-C_5$-alkoxycarbonyl,
- $B^3$ is $C_1-C_3$-alkyl, benzyl or phenyl and
- $R^4$ is methyl or ethyl.

* * * * *